W. P. EVANS.
LOOM CONNECTING ROD AND LUBRICATING DEVICE.
APPLICATION FILED JUNE 30, 1908.
945,841.
Patented Jan. 11, 1910.
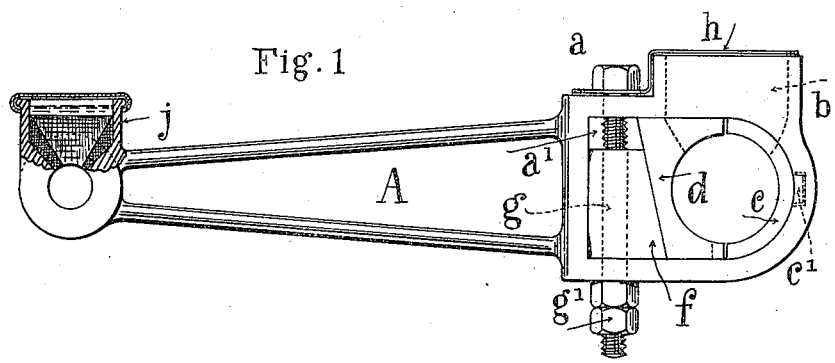
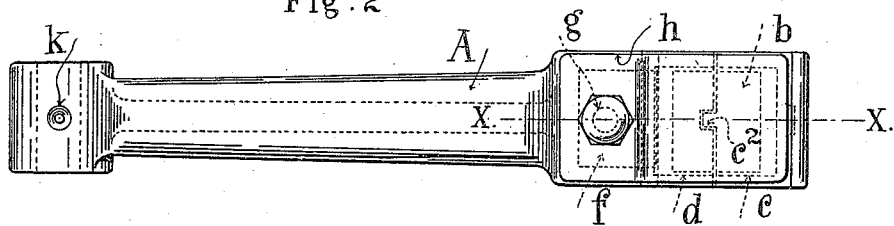
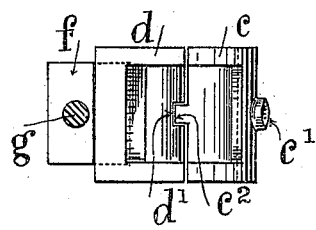
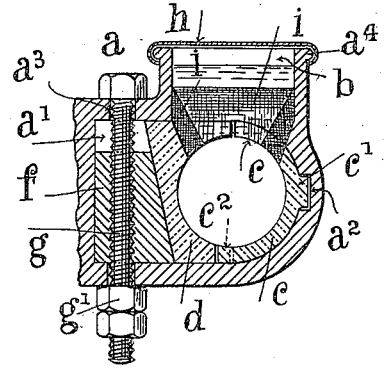
WITNESSES.
INVENTOR.
William Parsonage Evans.
By his Attorney.

UNITED STATES PATENT OFFICE.

WILLIAM PARSONAGE EVANS, OF MANCHESTER, ENGLAND, ASSIGNOR TO DAVID LIVINGSTONE SCHULTZ, OF MANCHESTER, ENGLAND.

LOOM CONNECTING-ROD AND LUBRICATING DEVICE.

945,841.  Specification of Letters Patent.  Patented Jan. 11, 1910.

Application filed June 30, 1908. Serial No. 441,225.

*To all whom it may concern:*

Be it known that I, WILLIAM PARSONAGE EVANS, a subject of Great Britain, residing at Weston Park Lane, Irlams-o'th-Height, Manchester, in the county of Lancaster, England, engineer, have invented new and useful Improvements in Loom Connecting-Rods and Lubricating Devices, of which the following is a specification.

My said invention relates to a new system of lubricating the crank-pin connections of looms where the connecting rods encircle or join-up on such cranks.

According to my invention I propose to produce combined connecting-rods and lubricating devices, whereby the connecting rod head (of whatever form) embodies brasses, steps, or bearings, and a supply vessel which is charged with grease to effect automatic lubrication.

The attached drawings show what I at present consider to be good practical embodiments of the idea set forth in the preamble.

In the said drawings:—Figure 1 illustrates a side elevation of a good form the new self-lubricating connecting rod for looms may assume. Fig. 2 is a plan view of a slightly different form. Fig. 3 shows separately, and in plan view, the two half brasses and setting-up block or wedge, and screw. Fig. 4 is a section through the connecting rod head, approximately on the line X—X. This figure also illustrates a slight modification in the cover or lid of the grease box.

The form of self-lubricating loom connecting rod illustrated is to be taken as typical only, because it is but one of a number of ways of carrying out my invention.

I form the head $a$ of the loom connecting rod A with an elongated gap or rectangular aperture $a'$, and also with a grease box $b$ of appropriate dimensions. The connecting rod with its aperture $a'$ and the four walls of the grease box $b$ is cast, bored, and machined, and is designed to suit the particular class of loom. The grease box $b$ is open to a sufficient extent at its base as the drawing shows. To fit the crank-pin I use two brasses, steps, or bearing halves $c$, $d$, which are so designed as to be retained in position in the elongated gap $a'$. In the way shown by the drawing, the bearing half or brass $c$ has an extension $c'$ which fits into a recess $a^2$ in the connecting rod head, (see Fig. 4), while the bearing half or brass $d$ is cut away at $d'$ and receives a projection $c^2$ formed on the bearing half or brass $c$. Any other convenient way of preventing endwise movement of the bearing halves or brasses when in position may be adopted. The bearing halves or brasses $c$, $d$, are cut away to suit the base of the grease box, and so that grease can find its way to the crank pin and the manner of cutting away the bearing halves or brasses at the top is well shown by Figs. 1, 3 and 4.

The back or rear-most wall of the bearing half or brass $d$ is shaped or inclined and is backed-up by a block or wedge $f$ which is passed side-wise into position in the gap in the connecting rod head. When in position, the block or wedge $f$ is held by a screwed bolt $g$ passing through a tapped hole therein and through plain holes $a^3$ $a^3$ bored in the connecting rod head. By means of this screwed bolt $g$ the position of the block or wedge $f$ can be regulated so as to adjust or set-up the bearing half or brass $d$ as is obvious, the tightening up of the nuts $g'$ $g'$ locking the bolt $g$ and making same firm. The bolt $g$ may also serve to hold on the grease box cover $h$, as indicated in Figs. 1 and 2; or the grease box cover may be formed with turned-over edges sliding over lips or beaded edges $a^4$ $a^4$, as is represented in Fig. 4.

In the grease box, wool or fiber $i$ is laid, in rectangular or other fashion, and more or less such wool or fiber lines the walls around the lower part of the grease box while yet allowing the grease to have free access to the crank pin over a certain area (see Fig. 4). The grease box only needs recharging at long intervals, and the arrangement permits of a ready change of the brass or bearing half $c$, while the brass or bearing half $d$ can at all times be readily set-up. I may fit a grease box at the opposite end of the crank arm where the same engages with the connection on the slay, and this grease box is lettered $j$ and is indicated in Fig. 1, but the use of such is not to be considered essential as oiling can take place through the usual oil holes $k$ (see Fig. 2).

By my invention I can obtain perfect and automatic lubrication of loom crank pins and the form of lubricated connection is such as to insure greater and more uniform wear. More uniform wear enables a more uniform beat up to be obtained in the loom.

I declare that what I claim is.

A loom connecting rod and lubricating device comprising a head having a gap therein, and a recess communicating with said gap, said recess extending upwardly through the upper part of the head and forming a grease box, a removable cover for the grease box, a wool wiper located in the grease box, brasses in the gap having recesses therein forming a continuation of the grease box, a wedge in the gap of the full width of the brasses and abutting against the wall of the gap and a bolt for holding the wedge in position.

In testimony whereof I have signed my name to this specification in the presence of two subscribing witnesses.

WILLIAM PARSONAGE EVANS

Witnesses:
HAMLET JOHN WILSON,
ALFRED YATES.